United States Patent
Losch

(10) Patent No.: US 11,220,607 B2
(45) Date of Patent: Jan. 11, 2022

(54) ANTICORROSIVE AGENT FOR CAVITY PRESERVATION, AND USE THEREOF

(71) Applicant: Fuchs Petrolub SE, Mannheim (DE)

(72) Inventor: Achim Losch, Westhofen (DE)

(73) Assignee: Fuchs Petrolub SE, Mannheim (DE)

( * ) Notice: Subject to any disclaimer, the term of this patent is extended or adjusted under 35 U.S.C. 154(b) by 0 days.

(21) Appl. No.: 17/278,292

(22) PCT Filed: Nov. 5, 2019

(86) PCT No.: PCT/EP2019/000303
§ 371 (c)(1),
(2) Date: Mar. 20, 2021

(87) PCT Pub. No.: WO2020/126063
PCT Pub. Date: Jun. 25, 2020

(65) Prior Publication Data
US 2021/0309864 A1 Oct. 7, 2021

(30) Foreign Application Priority Data

Dec. 18, 2018 (EP) ..................................... 18000979

(51) Int. Cl.
*C09D 5/08* (2006.01)
*C09D 7/61* (2018.01)
(Continued)

(52) U.S. Cl.
CPC ............. *C09D 5/086* (2013.01); *C09D 5/084* (2013.01); *C09D 7/61* (2018.01); *C09D 7/70* (2018.01); *C09D 167/08* (2013.01)

(58) Field of Classification Search
None
See application file for complete search history.

(56) References Cited

U.S. PATENT DOCUMENTS 5,633,305 A * 5/1997 Wesch ................. B05D 3/0263
524/296
6,103,306 A 8/2000 Miyahara et al.
(Continued)

FOREIGN PATENT DOCUMENTS

| CN | 1210872 | 3/1999 |
| CN | 103 897 590 | 7/2014 |

(Continued)

OTHER PUBLICATIONS

Tanigina, E. D.: The Influence of the Nature and Composition of the Inhibited Hydrocarbon Solvent on the Polyfunctional Properties of Protective Coatings; Ph D. Thesis; 2012; Tambov, Russia.
(Continued)

*Primary Examiner* — Joseph D Anthony
(74) *Attorney, Agent, or Firm* — Gudrun E. Huckett

(57) ABSTRACT

The present invention relates to an anticorrosive agent for cavity preservation, and to the use thereof. The anticorrosive agent has a base composition of 40 to 50 wt. % base fluid, 3 to 10 wt. % alkyd resin, 10 to 20 wt. % sulfonate and/or salicylate component, 15 to 25 wt.~% filler, 0.003 to 0.007 wt. % siccative catalyst, based in each case on the total mass of the anticorrosive agent. In addition to the base mixture, the anticorrosive agent includes 1 to 5 wt. % phyllosilicate and/or 1 to 8 wt.~% ester wax and/or paraffin wax, based in each case on the total mass of the anticorrosive agent, for adjusting the rheological properties of the anticorrosive agent. The anticorrosive agent, however, does not include any aminic corrosion protection or binder components, or any anti-skinning agent.

16 Claims, 7 Drawing Sheets

(51) Int. Cl.
*C09D 7/40* (2018.01)
*C09D 167/08* (2006.01)

(56) References Cited

U.S. PATENT DOCUMENTS

| | | | | |
|---|---|---|---|---|
| 11,053,372 | B2* | 7/2021 | Takahashi | C08G 8/34 |
| 2008/0035881 | A1 | 2/2008 | Kim | |
| 2011/0062669 | A1* | 3/2011 | Bach | C08G 18/7671 |
| | | | | 277/316 |
| 2015/0191607 | A1* | 7/2015 | McDaniel | C09D 7/48 |
| | | | | 424/409 |

FOREIGN PATENT DOCUMENTS

| | | |
|---|---|---|
| CN | 107 151 376 | 9/2017 |
| DE | 42 40 810 | 6/1994 |
| DE | 10 2008 011 489 | 8/2009 |
| EP | 2 865 723 | 4/2015 |
| JP | H01-92267 | 4/1989 |
| JP | H01-215866 | 8/1989 |
| JP | H02-500450 | 2/1990 |
| JP | H05-195261 | 8/1993 |
| JP | H11-222565 | 8/1999 |
| JP | 2009 208015 | 9/2009 |
| RU | 2384599 | 1/2010 |
| RU | 2436820 | 12/2011 |
| RU | 2562280 | 9/2015 |
| WO | 87/07627 | 12/1987 |

OTHER PUBLICATIONS

Grass et al.; Abstract 8Y224 in Journal of Chemistry, vol. 8, p. 32, 1987; Russia.
Malachov A. I et al.: Corrosion and Fundamentals of Electroplating; p. 93; 1987; Russia.
Rosengart et al. in Successes in Chemistry (Journal); 2nd issue; pp. 204-227; 1988; Russia.

* cited by examiner $T_S = 20 °C$, $T_A = 20 °C$ $T_S = 60\ °C,\ T_A = 20\ °C$

ANTICORROSIVE AGENT FOR CAVITY PRESERVATION, AND USE THEREOF

BACKGROUND OF THE INVENTION

The invention refers to a corrosion protection agent for the preservation of cavities and the use thereof.

It is known from prior art that, in particular, cavities in car bodies and the chassis of motor vehicles, which are exposed to water and/or humid and salty ambient air during operation of the vehicle, should be protected against corrosion by means of a corrosion protection agent. Cavities in a motor vehicle, which should be protected against corrosion, are, for example, present in the door sills, the columns, the doors and near the wings and wheel housings.

In order to seal the cavities, a cavity preserving agent which has a good creeping capability and also penetrates into cracks and seams is introduced into the cavities to form a permanently water-repellent protective layer over parts or over the entire surface of the cavity. Therein, the liquid preserving agent is, for example, sprayed into the cavity using a spray lance that is introduced through a discharge opening or using special spray nozzles in separate openings, allowing the preserving agent to creep into the cracks and seams. After a certain time, the liquid preserving agent solidifies wherefore, if need be, heating is required to stabilise the corrosion protection film formed.

In the manufacturing process of motor vehicles, rapid solidification is required, so that the cavity preserving agent which, on the one hand, may cause contamination to the component and, therefore, time-consuming cleaning work having to be carried out before the component is painted or the finished vehicle is output is prevented from exiting during the process steps following cavity sealing. On the other hand, exiting cavity preserving agent may cause contamination of the shop floor which, in addition to an increased amount of cleaning work, is connected with an increased risk of accident to the workers.

Furthermore, the protection film formed by the hardened preserving agent should have a certain flexibility and flowability in order to compensate for component movements or changes in the volume of the cavity due to temperature-related thermal expansion.

So-called full solid waxes which are not diluted with solvents or water may contain thermally active additives which are, for example, dispersed particles of solid polymers or waxes with a low softening point. After the agent has been sprayed and distributed into the cavity, the component is exposed to increased temperature conditions, with the result that the thermally active additives dissolve completely or partially. After cooling down, the cavity preserving agent gels so that it cannot flow out during the following process steps any more, while the actual hardening takes place through a later chemical cross-linking reaction.

JP 2009 208 015 describes a corrosion protection treatment for a car body in which the wax which contains such a drop stop additive, i.e., a thixotropic agent of the heating type, is applied onto a region of the car body that was subjected to a corrosion protection treatment, wherein the wax that was liquefied by heating is allowed to penetrate into the bottleneck of the car body, to thicken and to cool down. Any further heating of the wax will no longer reduce the viscosity, with the result that the wax remains in the bottleneck.

DE 10 2008 011 489 A1 discloses a known cavity preserving agent which solidifies without being heated. A cross-linkable component (alkyd resins, acrylic resins, polyesters, native and synthetic oils and resins with OH functionality, oxidised waxes and petroleum jellies, preferably castor oil) is admixed to this cavity preserving agent in an amount of 5 to 15 percent by weight in relation to the ready-to-use cavity preserving agent, to which a cross-linking component has been added. The cross-linking component (amines, peroxides, isocyanates, preferably di-isocyanates) is present in an amount of 0.1 to 10 percent by weight, with the result that the cavity preserving agent, after having penetrated into the vehicle component, solidifies to obtain a gel-type consistency and then hardens after excessive cavity preserving agent has been allowed to drip out of the vehicle component. Therein, the basic cavity preserving agent may have anti-corrosion additives, such as calcium sulphonate, oxidatively cross-linking binding agents, such as alkyd resins, flexibilisers, such as mineral oil, fillers, such as talcum, rheologic additives, such as inorganic thickeners, e.g., bentonites, organic or inorganic bases also contributing to corrosion protection, such as triethylene diamine, catalysts for oxidative hardening of the binding agent, such as manganese salts, and other additives, such as 2-butanonoxime, for example in order to prevent a skin from forming when letting the agent stand.

DE 42 40 810 A1 discloses a coating agent which is based on waxes, wax-like compounds, drying oils or alkyd resins the drop behaviour of which is improved by a mixture of a polymer powder and a softening agent which gel at an increased temperature. The coating agent from comparative example 1 has, for example, a solid body content of 60% and a viscosity of 80 mPa and consists of a resin solution and a grinding paste which are homogeneously mixed with one another:

23.6 parts of hydrocarbon resin consisting of vinyl toluene/styrene/indene
4.0 parts of oxidised petroleum jellies, acid number 50
4.0 parts of a mixture consisting of micro paraffin wax and slack wax, solidification point approx. 65° C.
1.1 parts of acid alkyl-aryl-polyglycol ether phosphate
2.2 parts of a mixture consisting of fatty acid alkanol-amides
33.1 parts of solvent naphtha 135/180
in the resin solution and
8.0 parts of overbased calcium sulphonate in mineral oil (e.g. PCA 11507 from Exxon)
3.0 parts of a calcium sulphonate/calcium carbonate complex with added solvent naphtha
9.4 parts of technical white oil
6.0 parts of precipitated chalk
1.7 parts of magnesium montmorillonite
3.0 parts of solvent naphtha 135/180
0.9 parts of n-propanol
in the grinding paste.

A further composition for a corrosion protection agent for the preservation of cavities is described in EP 2 865 723 B1. It can be applied and solidified without heating and does not contain any volatile organic compounds. This composition is comprised of 25 to 40 weight percent of base fluid which consists of VOC-free solvents, mineral oils, esters and combinations thereof, as well as of 19 to 25 weight percent of polyester resin, 7.0 to 11.0 weight percent of a wax mixture consisting of at least two solid paraffins differing in their solidification point, 12.0 to 18 weight percent of a corrosion protection additive selected from alkaline and earth alkaline sulphonates, salicylates, wool greases and combinations thereof, 15 to 25 weight percent of filler, and 0.4 to 0.6 weight percent of an additive or an additive mixture, comprising skin preventing agents, siccative or colourant. This corrosion protection agent has an optimised rheology, with the result that it will have a low defined viscosity after having been sheared, for example by stirring, so that it can also be applied at room temperature. If the corrosion protection agent comes to rest on the component after having been applied, the viscosity rises again considerably, wherein the drop inhibition thus obtained is determined by the wax mixture and the sulphonates.

In either case, heating is not required to stabilise the corrosion protection film; on components which are already warm or which are to be heated after cavity preservation, however, there will be no specific improvement as compared to conventional full solid waxes with thermally active drop stop additives—on the contrary, the drop inhibition may even rather decline if the components are heated.

Based on this prior art, it is an object of the present invention to provide an improved cavity preserving agent.

SUMMARY OF THE INVENTION

This object is achieved by a corrosion protection agent for the preservation of cavities, which comprises a basic composition of 40 to 50 weight percent of base fluid,
3 to 10 weight percent of alkyd resin,
10 to 20 weight percent of sulphonate and/or salicylate component,
15 to 25 weight percent of filler,
0.003 to 0.007 weight percent of siccative catalyst,
each in relation to the total mass of the corrosion protection agent,
and which, in order to adjust the rheologic properties of the corrosion protection agent, furthermore comprises
1 to 5 weight percent of sheet silicate
and/or
1 to 8 weight percent of ester wax and/or paraffin wax,
each in relation to the total mass of the corrosion protection agent,
wherein the corrosion protection agent comprises no aminic corrosion protection or binding agent components and no anti-skin agent.

Furthermore, the invention concerns the use of the corrosion protection agent as claimed for the preservation of cavities of components, wherein the rheologic properties of the corrosion protection agent are adjusted subject to an application temperature and a component temperature by means of the predeterminable/predetermined contents of the sheet silicate and the ester and/or paraffin wax, which use allows an optimal film formation irrespective of an application or component temperature.

Preferred embodiments are illustrated in the subordinate claims.

According to a first embodiment of the corrosion protection agent for the preservation of cavities, the corrosion protection agent has a basic composition which, for adjusting the rheologic properties of the corrosion protection agent, contains 1 to 5 weight percent of sheet silicate and/or 1 to 8 weight percent of ester wax and/or paraffin wax in relation to the total mass of the corrosion protection agent. Therein, the sheet silicate the influence of which on the viscosity of the corrosion protection agent is almost independent of the temperature but which gives the corrosion protection agent thixotropic properties, provides a largely temperature-independent film stabilisation and drop inhibition for the corrosion protection agent, i.e., an improved thermal stability of the freshly applied, not yet cross-linked film. In contrast, the ester and/or paraffin wax(es) the viscosity of which is temperature-dependent and which has a yield point above the solubility limit and below the clear point provides for a temperature-dependent hardening of the film and improves the film stability after completed heat exposure.

Depending on the intended application temperature of the corrosion protection agent and the component temperatures developing therein or thereafter, it is thus possible to adjust an optimised drop and jellification behaviour by varying the contents of sheet silicate and ester/parrafin wax, wherein optionally sheet silicate or ester/paraffin wax or both components may be used in a corrosion protection agent with the following basic composition within the content ranges specified. According to a first embodiment of the composition according to the invention, the basic composition comprises 40 to 50 weight percent of base fluid, 3 to 10 weight percent of alkyd resin, 10 to 20 weight percent of sulphonate and/or salicylate component, 15 to 25 weight percent of filler and 0.003 to 0.007 weight percent of a siccative catalyst for regulating the drying and hardening behaviour. All content data refer to the total mass of the corrosion protection agent. Commercially available delivery forms of siccative catalysts are often provided dissolved in solvents, wherein the offers include various concentrations of the siccative catalyst in solution. In order to achieve the desired content of the siccative catalyst of 0.003 to 0.007 weight percent (i.e., 30 to 70 ppm) in the corrosion protection agent, the content of the siccative catalyst solution having, for example, a content of active component of 1% is within a range of 0.3 to 0.7 weight percent with respect to the corrosion protection agent. If, for example, the siccative catalyst solution comprises a content of active component of 10% the content of the solution is within a range of 0.03 to 0.07 weight percent with respect to the corrosion protection agent.

Advantageously, this corrosion protection agent for the preservation of cavities achieves the object of allowing a stabilisation of the cavity preserving agent that is applied as a film even without any cross-linking component or with only a low content of the same both with and without heating, with the result that the solidification properties may be harmonised with any component temperature desired. Furthermore, it has improved properties with regard to odour emissions and corrosion protection.

To achieve this, the corrosion protection agent according to the invention does without any high-dosage cross-linking component as it is required in prior art, in order to allow the corrosion protection agent gel even without heating. Furthermore, the corrosion protection agent according to the invention does not contain any aminic corrosion protection or binding agent components. By doing without amines, isocyanates and di-isocyanates, odour and emissions are considerably improved and/or reduced.

By varying the contents of sheet silicate and ester/paraffin wax, the corrosion protection agent can be optimised for forming a film in cold applications wherein it is not necessary to heat the components for a specific film stability and be equipped with a temperature-dependent drop stop effect which also allows application on heated components and does not adversely affect the film stability with subsequent heat exposure. The corrosion protection agent can meet these two requirements, irrespective of whether the component is cold, is briefly heated or is constantly warm.

The optimisation of the rheologic behaviour is supported by the components of the basic composition: The filler and sulphonate components affect the viscosity irrespective of the temperature, wherein the sulphonate contributes to the thixotrophy of the corrosion protection agent, with the result that the viscosity of the corrosion protection agent clearly decreases under shear stress and the corrosion protection agent, having a high viscosity in rest, has a viscosity that is suitable for spraying after completed shearing, e.g., by stirring. For that reason, the viscosity of the corrosion protection agent, after it has been applied on the surface of the component as a film and has penetrated into cracks, again rises within seconds or minutes such that it is prevented from leaking or dropping irrespective of the temperature before the hardening of the resin takes place.

In contrast, the base fluid and the alkyd resin which has not undergone any reaction, both being Newtonian fluids, have a temperature-dependent viscosity and represent the lower limit of the viscosity of the corrosion protection agent, in order to cause the required penetration of the medium into cracks and seams as well as the distribution within the cavity after the spray application. After a certain time has elapsed after the application, the cross-linked polymerised alkyd resin provides for a yield point, wherein the effect of thermal stability already takes place with resin concentrations of >3 weight percent. Depending on the user's specific requirements, it is possible to specifically adjust the rheologic properties of the corrosion protection agent.

The reduction of the alkyd resin content results in lower emissions and an improved odour of the corrosion protection agent and, at the same time, in an improved corrosion protection effect which, moreover, is further improved by the ester wax.

Advantageously, the alkyd resin content which is clearly reduced as compared with the prior art contributes to further improved corrosion protection and provides for a lower emission and odour load. On the one hand, the disadvantage caused by the reduction of the resin concentration with regard to the film consistency, because wax-like wipe-proof structures can be obtained to a certain extent only or can be obtained not at all, is counteracted by the use of especially low-emission alkyd resins which can have higher concentrations with the same emission or result in a lower emission with the same concentration. On the other hand, the other additives (sulphonate, filler, sheet silicate, and ester/paraffin wax) affecting the rheologic properties make up for the reduction of resin which is the stabilising component.

Due to the reduced content of alkyd resin, it is, advantageously, possible to do without an anti-skin agent in the corrosion protection agent according to the invention, since the corrosion protection agent comprises 3 to 10 weight percent of alkyd resin and therefore does not show any skin formation. Advantageously, the odour load is further reduced by the corrosion protection agent according to the invention because an anti-skin agent which often contains oximes is not necessary.

In a further embodiment of the corrosion protection agent, the basic composition can, furthermore, have 0.5 to 5 weight percent, preferably 1 to 3 weight percent, of an alkaline acid scavenger component in relation to the total mass of the corrosion protection agent, in order to further reduce the odour and the emissions. The alkaline acid scavenger component not only reduces emissions and improves the odour of the corrosion protection agent by binding organic acids, but also provides for a significantly improved corrosion protection effect. The alkaline acid scavenger component can be selected from a group consisting of alkaline and alkaline earth salts, preferably the phosphates, carbonates, silicates, hydroxides, oxides and sulphonates thereof, with overbased sulphonates preferably among them, as well as zirconium phosphate and zinc oxide, wherein zinc oxide is particularly preferred which not only binds odour- and emission-reducing organic acids, e.g., short-chain carboxylic acids, but also advantageously contributes to improved corrosion protection. Other ones of the acid scavenger components mentioned can also have corrosion protection properties, among them, for example, carbonates and sulphonates which, in specific embodiments of the corrosion protection agent, can also be used as filler and/or sulphonate component. In the embodiments in which, for example, overbased sulphonate is selected as acid scavenger component, the content of the acid scavenger component can therefore but does not have to be added to the filler/sulphonate component contained in the corrosion protection agent—the acid scavenger properties of the filler and the sulphonate component of the basic composition can already be sufficient within the ranges mentioned above. Should this not be the case, the contents of the filler/sulphonate component can be added to the contents of the acid scavenger component, with the result that the basic composition can then have 10.5 to 40 weight percent of filler with an alkaline acid scavenger property or 5.5 to 35 weight percent of sulphonate component with an alkaline acid scavenger property.

In a further embodiment of the corrosion protection agent, the basic composition can, furthermore, have 0.1 to 5 weight percent, preferably 0.5 to 2.5 weight percent, of an odour scavenger component in relation to the total mass of the corrosion protection agent, in order to further reduce the odour and the emissions. This can, for example, be an adsorbent for aldehydes, such as zeolites, or reactive components for the conversion of aldehydes, such as amides, for example malonic amide.

Alternatively or additionally, the basic composition may have a colourant additive which is present in the corrosion protection agent with a content of 0.001 to 0.05 weight percent, preferably 0.01 weight percent. The colourant additive facilitates a visual check during the application of the corrosion protection agent and of the applied film, wherein a fluorescent colourant additive may be preferred, with the result that the visual check comprises the use of a corresponding (UV) light source for exciting the fluorescent colourant additive.

In a preferred embodiment, the corrosion protection agent may have at least one polar swelling agent component with at least one carbonyl and/or hydroxyl group, depending on the content of the sheet silicate. Herein, a swelling agent component is understood to mean an agent which supports the swelling of the sheet silicate. The polar swelling agent component is selected from a group consisting of water, short-chain alcohols, such as methanol and ethanol, esters, such as propylene carbonate, and ketones, such as acetone, as well as mixtures thereof. Therein, the content of the at least one polar swelling agent component may be within a range of 10 to 30 weight percent, preferably within a range of 17 to 23 weight percent, in relation to the content of the sheet silicate. Particular preference can be given to mixtures of swelling agent components which have 19% of an organic swelling agent compound, i.e., short-chain alcohol, ester or ketone, and 1 to 5% of water, in relation to the content of the sheet silicate.

In this particularly preferred embodiment, the corrosion protection agent according to the invention, which comprises 0.1 to 7 weight percent of sheet silicate, may, as swelling agent for the sheet silicate and depending on the content of the sheet silicate, have 0.019 to 1.33 weight percent of swelling agent component in relation to the total mass of the corrosion protection agent, as well as 0.005 to 0.07 weight per cent of water in relation to the total mass of the corrosion protection agent, for opening up the sheet silicate, wherein tap water is adequate. Preferably, propylene carbonate may be used as swelling agent component, propylene carbonate being an almost odourless solvent. Herein, however, alternative swelling agent components for intercalation in the sheet silicate can also be acetone, methanol or ethanol or other short-chain alcohols.

In a further embodiment, the corrosion protection agent according to the invention, which contains 1 to 5 weight percent of sheet silicate, may, depending on the content of the sheet silicate, have 0.19 to 0.95 weight percent of swelling agent component in relation to the total mass of the corrosion protection agent, as well as 0.01 to 0.05 weight percent of water in relation to the total mass of the corrosion protection agent, for opening up the sheet silicate.

Thus, the content of the swelling agent component may, in particular, be 19% of the sheet silicate content and the content of water may be 1 to 5% of the sheet silicate content. As a result, the corrosion protection agent does not have any swelling agent component nor any water, if it does not contain any sheet silicate.

The base fluid of a corrosion protection agent according to the invention may be a non-polar solvent which may preferably be a group III base oil, i.e., a catalytically hydroisomerized and dewaxed neutral base oil with hydrated highly isoparaffinized hydrocarbons (C20-50), said base oil having a kinematic viscosity (40° C.) within a range of 5 to 40 mm$^2$/s, preferably of 10 to 30 mm$^2$/s, more preferably of 10 to 20 mm$^2$/s. Alternatively, it is also possible to use a group II or group IV base oil having the appropriate kinematic viscosity (40° C.) as base fluid. Therein, preference is given to base oils with a viscosity index of more than 100, which show only minor changes in viscosity in relation to the temperature. It is also possible to use mixtures of different base oils.

Alternatively, however, it is also possible to use polar solvents, such as water, methanol, ethanol, another short-chain alcohol, acetone or a mixture thereof, such as a mixture of methanol and water or a mixture of ethanol and water, as base fluid. If water, methanol, ethanol, other short-chain alcohols, acetone or a mixture thereof, such as a mixture of methanol and water or a mixture of ethanol and water, are selected both for the base fluid and the swelling agent component, the content of the selected polar solvent may be within the range of the sum total of the contents specified for the base fluid and the swelling agent component, i.e., if the same polar solvent is selected for the base fluid and the swelling agent component, then the content of the polar solvent corresponds to the sum total of base fluid and swelling agent component.

Preferably, the alkyd resin used in a corrosion protection agent according to the invention is a low-odour and low-emission, low-viscosity, non-water-mixable and air-drying alkyd resin. Preferably, use can be made of long-oil alkyd resins which have a non-volatile content of at least 98% and a dynamic viscosity (20° C.) of 500 to 12,000 mPa·s, preferably of 1,000 to 6,000 mPa·s.

Preferably, the sulphonate or salicylate component used may be a thixotropic overbased calcium sulphonate which contributes both to corrosion protection and to shear thinning. Alternatively or additionally, it is also possible to select a different corrosion-protection-improving sulphonate, such as an amorphous overbased calcium or magnesium sulphonate or an amorphous overbased calcium salicylate or mixtures thereof.

The filler can be selected from carbonates, silicon dioxides, silicates, sulphates and oxides. Usable carbonates comprise, for example, calcium carbonate, more particularly natural precipitated calcium carbonate, e.g., chalk, as well as magnesian limestone and barium carbonate. Silicone dioxide can be used in amorphous or crystalline form, e.g., as quartz, cristobalite, kieselguhr, pyrogenic precipitated synthetic silicic acids or glass powder. Silicates as fillers can be selected from talcum, pyrophyllite, chlorite, kaoline, mica, feldspar, wollastonite, slate powder, hornblende, perlite, aluminium silicate, calcium silicate, calcium aluminium silicate, or sodium aluminium silicate. Suitable sulphates are, for example, barium sulphate or calcium sulphate. Oxides as fillers can be selected from titanium dioxide, aluminum oxide, e.g. corundum, Al hydroxide, Mg hydroxide and Mg oxide. In a particularly preferred embodiment, the filler selected may be calcium carbonate because it has a lower solubility and a lower corrosiveness as compared with, for example, calcium sulphate. Furthermore, calcium carbonate is hardly effective as acid scavenger, so that there will be no overlapping with the alkaline acid scavenger component.

The siccative catalyst may be a heavy-metal-based complex which is based on cobalt, manganese, lead or zinc; preferably, however, an iron-based complex, which has a good drying activity and does not result in any discolouration even if the amount used is small, is used in a corrosion protection agent according to the invention. Suitable heavy-metal-based siccative catalyst complexes, e.g., the iron-based complex, are available in the usual delivery form in a solvent, e.g., propylene glycol. This also applies to the iron-based catalyst complex solution which is used with particular preference and which is available from Borchers GmbH, Langenfeld, DE under the name of Borchi® Oxy-Coat. This company offers the active iron complex in solution (CAS no. 478945-46-9) in various concentrations, with the result that the dosage depends on the concentration of the iron complex in the respective delivery form. If the desired—and particularly preferred—concentration of the active complex in the corrosion protection agent according to the invention is, for example, 0.005% (i.e., 50 ppm), this content can optionally be achieved with 0.5% of a 1% catalyst complex solution or with 0.05% of a 10% catalyst complex solution. Therein, it is preferred to use catalyst complex solutions having a higher concentration because this helps to limit a reduction of the viscosity of the composition by the solvent comprised in the delivery form.

The sheet silicate used for adjusting the rheology may, in particular, be a three-sheet silicate or a mixture having a three-sheet silicate. A preferred three-sheet silicate may be montmorillonite or hectorite, and a preferred mixture may be a bentonite that contains 60 to 80% of montmorillonite. Other companion minerals in the bentonite may be quartz, mica, feldspar, pyrite or calcite. Furthermore, smectites may be used as a mixture having three-sheet silicate, Smectites mainly consist of montmorillonite as well, but can also contain quartz dust and calcite dust.

Montmorillonite and hectorite are clay minerals from the mineral class of silicates and germanates. Montmorillonite is a sodium aluminium silicate having the chemical composition (Na, Ca)$_{0.3}$(Al, Mg)$_2$Si$_4$O$_{10}$(OH)$_2$·nH$_2$O. Hectorite is a lithium magnesium silicate having the chemical composition Na$_{0.3}$(Mg, Li)$_3$Si$_4$O$_{10}$(OH)$_2$.

The ester and/or paraffin wax that is used as an alternative of or in addition to the sheet silicate may have a dropping point within a range of 65 to 90° C., preferably of 70 to 80° C. An exemplary ester wax may be a sunflower wax.

A use according to the invention of the corrosion protection agent according to the invention for the preservation of cavities of a component provides that the rheologic properties of the corrosion protection agent are adjusted depending on a predetermined application temperature and a predetermined component temperature by means of the predeterminable or predetermined contents of the sheet silicate and the ester and/or paraffin wax. A corrosion protection agent according to the invention which contains sheet silicate but no wax shows a drop behaviour which does not depend or only hardly depends on the application temperature and the substrate and/or component temperature and is determined by the content of the sheet silicate, wherein a higher content of sheet silicate results in an increased drop inhibition. In a corrosion protection agent according to the invention which contains wax but no sheet silicate, the drop behaviour depends both on the application temperature and the component temperature. If the corrosion protection agent is cold, i.e., if it has not been heated, and is applied onto a component having the same or a similar temperature, a wax-containing corrosion protection agent has a drop behaviour in which drop inhibition occurs after a few minutes, whereas cold application of the wax-containing corrosion protection agent onto a heated component results in a drop behaviour with significantly delayed drop inhibition. In contrast, warm application of the wax-containing corrosion protection agent onto a cold, i.e., non-heated component, results in a drop stop effect, i.e., the drop inhibition occurs shortly after application. Although corrosion protection agents according to the invention which contain both sheet silicate and wax show a drop behaviour like the wax-containing corrosion protection agents, i.e., a drop behaviour which depends on the application temperature and the component temperature, they have an improved drop inhibition, wherein an increased content of sheet silicate results in increased drop inhibition.

With the other rheologically active components of the corrosion protection agent according to the invention, i.e. base fluid, filler, alkyd resin, the desired rheological application behaviour can be adjusted by selecting the ratios of these components accordingly: flowing after spraying/penetration into cracks, sprayability, thermal stability of the film, mechanical stability of the film, etc. Advantageously, the basic composition can, herein, be provided in prefab form and the desired rheologic behaviour of the corrosion protection agent can be adjusted by adding the contents of wax and/or sheet silicate.

Further embodiments as well as some of the advantages which are associated with these and further embodiments become clear and better understandable by the following detailed description which refers to the accompanying figures. The figures are just a schematic representation of one embodiment of the invention.

BRIEF DESCRIPTION OF THE DRAWINGS

In the figures.

DESCRIPTION OF PREFERRED EMBODIMENTS

Figure 1:
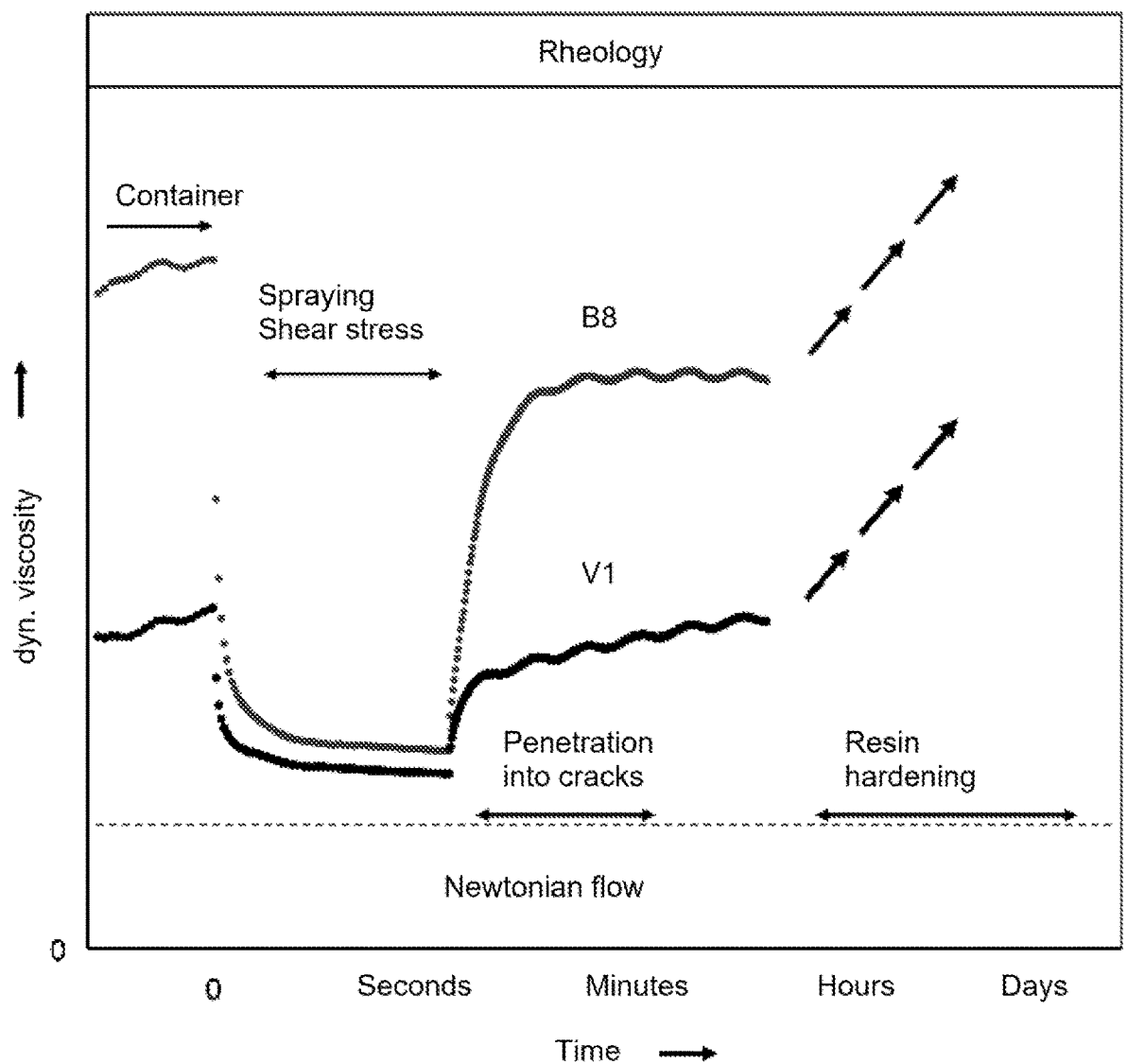
FIG. 1 is a diagram which shows the viscosity of a corrosion protection agent B8 according to the invention as compared with a conventional corrosion protection agent V1 as a function of time during storage and application.

As compared with the conventional, cold applied corrosion protection agents which are able to harden without heat exposure, the corrosion protection agent according to the invention has an improved corrosion protection and significantly reduced emissions and odour loads. In addition, the corrosion protection agent according to the invention allows the component, into the cavity of which the corrosion protection agent is to be applied for film formation, to be constantly or temporarily exposed to heat, without the film stability or hardening process being adversely affected. The rheologic properties adjusted in the corrosion protection agent according to the invention provide a viscosity and a flow behaviour which ensure the sprayability and the capability of gelling after temporary heating (drop stop). Table 1 shows the compositions of the corrosion protection agent according to the invention with wide and preferred content ranges of the respective components. The first five components, i.e., base fluid, alkyd resin, sulphonate component, filler and catalyst, form the basic composition to which sheet silicates and/or ester/paraffin waxes in the contents specified are optionally added depending on the component and/or application temperatures provided while the corrosion protection agent is being used, in order to obtain a corrosion protection agent according to the invention. The content data each refer to 100 weight percent of the corrosion protection agent.

TABLE 1

Components of the corrosion protection agent according to the invention

| | Content [wt %] |
|---|---|
| Base fluid | 40-50 |
| Alkyd resin | 3-10 |
| Sulphonate and/or salicylate component | 10-20 |
| Filler | 15-25 |
| Catalyst/siccative | 0.003-0.007 |

TABLE 1-continued

Components of the corrosion protection agent according to the invention

| | Content [wt %] |
|---|---|
| and for adjusting the desired film stability | |
| Sheet silicates | 1-5 |
| Polar swelling agent component | (17-23% in relation to sheet silicate) |
| Preferably: | |
| Organic swelling agent component and | 0.19-0.95 |
| Water | 0.01-0.05 |
| and/or | |
| Ester wax and/or paraffin wax | 1-8 |
| and optionally | |
| Alkaline acid scavenger component | 1-3 |
| Odour scavenging component | 0.5-2.5 |
| Colourant additive | 0.01 |
| Anti-skin agent | — |

The content of the alkyd resin in the corrosion protection agent according to the invention is significantly reduced in order to reduce emissions and odour and to improve the corrosion protection since higher resin contents are generally disadvantageous for an excellent corrosion protection. Since, in particular, no cross-linking component is used, such a low content of alkyd resin would, however, result in a retarded film formation and a softer film consistency with no or hardly any wax-like wipe-proof structures if this was not compensated for by the further components of the corrosion protection agent according to the invention which affect the rheologic behaviour. Therein, the sheet silicate, filler and sulphonate component the influence of which on the viscosity of the corrosion protection agent is hardly dependent on the temperature provide for an improved film stability and prevent dropping, while ester wax the viscosity of which is temperature-dependent provides for a drop stop behaviour and improves the film hardness. Alkyd resin which has not undergone any reaction and base fluid have a temperature-dependent viscosity and provide for the sprayability of the corrosion protection agent and its penetration into cracks, wherein the alkyd resin, after a certain time, ensures a yield point by cross-linking and/or polymerisation, with the result that the applied film becomes thermally stable and has an adequate film hardness.

To reduce the odour load and the emissions, the alkyd resins that are used in the corrosion protection agent according to the invention are of the low-odour and low-emission type and moreover have a low viscosity, cannot be mixed with water and are air-drying. Preferably, the alkyd resins used are long-oil alkyd resins and have a non-volatile content of at least 98%. The dynamic viscosities (20° C.) are within a range of 500 to 12,000 mPa·s, preferably of 1,000 to 6,000 mPa·s.

Suitable alkyd resins are, for example, WorléeKyd® SD 8300 ($V_{dyn}$ (20° C., 100 s$^{-1}$, C35/1°) 3,000 to 6,000 mPa·s), WorléeKyd® VP-W 2733100 ($V_{dyn}$ (20° C., 100 s$^{-1}$, C35/1°) 3,000 to 5,000 mPa·s) or WorléeKyd® RS 2174 ($V_{dyn}$ (20° C., 100 s$^{-1}$, C35/1°)<750 mPa·s), available from Worlée-Chemie GmbH, Klingenberg am Main, DE. Further suitable alkyd resins are, for example, Bremar® RK 5949 ($V_{dyn}$ (20° C., 100 s$^{-1}$, C35/1°) 1,500 to 3,000 mPa·s), Bremar® RK 6389 ($V_{dyn}$ (20° C., 100 s$^{-1}$, C35/1°) 1,000 to 2,000 mPa·s), Bremar® RK 6520 ($V_{dyn}$ (20° C., 100 s$^{-1}$, C35/1°) 3,000 to 6,000 mPa·s), Rokralux® RK 6739 ($V_{dyn}$ (20° C., 100 s$^{-1}$, C35/1°) 1,000 to 2,000 mPa·s), Bremer® RK 7046 ($V_{dyn}$ (20° C., 100 s$^{-1}$, C35/1°) 1,500 to 3,000 mPa·s), Bremar® RK 7047 ($V_{dyn}$ (20° C., 100 s$^{-1}$, C35/1°) 2,000 mPa·s), available from Robert Kraemer GmbH & Co. KG, Rastede, DE, or Synthalat® QL 4724 ($V_{dyn}$ (23° C.) 8,000 to 12,000 mPa·s), available from Synthopol Chemie, Buxtehude, DE.

The base fluid is also selected with respect to odour/emissions and viscosity. Preferably, the base fluid is therefore selected from solvents that are free from VOC and aromatic compounds and have a kinematic viscosity (40° C.) of 5 to 40 mm$^2$/s, preferably of 10 to 30 mm$^2$/s, for example 10 to 20 mm$^2$/s, and a viscosity index (VI) of at least 100 and, thus, only a low dependency of the viscosity on the temperature. To achieve this, group III oils, if necessary group-IV oils as well, can be preferably used as base fluid. Suitable group III base oils are, for example, Nexbase® 3043 (kinematic viscosity (40° C.)=20 mm$^2$/s, VI≥121) or Nexbase® 3030 (kinematic viscosity (40° C.)=12 mm$^2$/s, VI≥100), available from Neste N. V., Beringen, BE. As a matter of course, it is also possible to use mixtures of different base oils as base fluid. Furthermore, it is alternatively possible to use polar solvents, such as water, methanol, ethanol, another short-chain alcohol or acetone or a mixture thereof, such as a mixture of methanol and water or a mixture of ethanol and water, as base fluid.

The thixotropic sulphonate component in the following exemplary compositions is an overbased calcium sulphonate which is, for example, available under the name of Arcot® 645 from PCAS, Longjumeau, FR, Sulfogel® 180/200A/280, 380 from Holland Chemicals, Burr Ridge, USA, or ThixoCal® 2000 from Soltex, Houston USA.

As an alternative to a thixotropic overbased calcium sulphonate, it is also possible to use amorphus overbased calcium sulphonate, e.g., Calcinate® or Hybase® OTS, OR, C300, C400, C400C, 313 from Lanxess, cologne, DE, amorphous overbased magnesium sulphonates, e.g. Hybase® M 400 from Lanxess, or amorphous calcium salicylates, such as Hybase® S-170D, S-200, S-270D, MS100 from Lanxess, as corrosion protection component. However, these do not contribute to shear thinning because they do not have any thixotrophic properties.

In the following exemplary compositions of the corrosion protection agent according to the invention, calcium carbonate (e.g., Omyacarb® 2-AL from Omya GmbH, DE) is used as filler or pigment, said calcium carbonate having improved corrosion protection properties as compared with the conventionally used calcium sulphate, this being due to the lower solubility of the carbonate and the higher corrosiveness of the sulphate among other reasons. However, there is a plurality of other known substances which can also be used as filler or pigment, comprising further alkaline earth carbonates, various forms of silicone dioxide and silicates, sulphates and oxides.

Preferably, a fluorescent optical bleaching agent, such as Tinopal® OB from Ciba, Basel, CH, can be used as colourant additive.

To control the drying time of the film formed, a metal-base catalyst which catalyses the autoxidation of the alkyd resin is used as siccative. Suitable catalysts may be heavy-metal-based catalysts. Known siccatives comprise octoates and naphthenates based on cobalt, manganese and zirconium. Further known siccatives are heavy-metal oxides of lead, manganese, cobalt, zinc as well as metallic soaps of mostly unsaturated fatty acids. Preferably, however, an iron complex which is dissolved in solvent and available from Borchers GmbH, Langenfeld, DE, under the name of Borchi® Oxy-Coat, is used as siccative.

In the corrosion protection agent according to the invention, the aldehydes and carboxylic acids released while the alkyd resin is hardening are bound by add and odour scavenger agents. By binding the released, mainly short-chain carboxylic acids, the alkaline acid scavenger component reduces not only odour and emissions but also has corrosion protection properties, thus improving the corrosion protection. A preferred alkaline acid scavenger component is zinc oxide which is available from Borchers GmbH, Langenfeld, DE, e.g., as Bayoxide® Z Active. Further acid scavenger components comprise alkaline and alkaline earth salts, phosphate, carbonate, silicate, strontium phosphate, magnesium oxide, calcium hydroxide, zirconium phosphate, as well as overbased sodium sulphonates (e.g., Lubrizol® 5318 A from Lubrizol, Wickliffe, USA) or overbased calcium sulphonates (e.g., Calcinate® OR from Lanxess, Köln, DE).

Zeolites (Zeoflair® 100 from Zeochem® AG, Rüti, CH) which also adsorb short-chain carboxylic acids can be used as an odour scavenger component for adsorbing the developing aldehydes, or reactive components, such as amides, e.g., malonic amide, can be used for the reactive conversion of the aldehydes.

The sheet silicates that are used to increase the viscosity of the corrosion protection agent according to the invention and to improve the thermal stability of the fresh, not yet cross-linked film comprise, in particular, three-sheet silicates, such as montmorillonite or hectorite. It is particularly preferred to use a mixture of different clay minerals, preferably bentonite which contains 60 to 80% of montmorillonite as its main component. The further minerals that are contained in bentonites comprise quartz, mica, feldspar, pyrite or calcite. As an alternative to bentonites, it is also possible to use smectites which also contain montmorillonite as main component. An example of a bentonite that is adapted to be used in a corrosion protection agent according to the invention is a treated, organically modified bentonite which is available from Elementis Specialties, Inc., Hightstown, USA, under the name of Baragel® 3000. To decompose the sheet silicate, water evaporating during the manufacturing process and a swelling agent, e.g. propylene carbonate which forms an interstitial complex with the sheet silicate, thus supporting the decomposition, can be added to the corrosion protection agent according to the invention. The contents of water (tap water is adequate) and swelling agent therefore depend on the content of the sheet silicate in the corrosion protection agent.

Further examples of bentonites which can be used in a composition according to the invention are Baragel® 10, Bentone® 34. The additive Nykon® 77 which contains the tetraalkyl ammonium bentonite with a corrosion inhibitor can also be used as sheet silicate in a composition according to the invention wherein, however, a swelling agent component different from propylene carbonate is preferred because the additive also contains sodium nitrite which would react with propylene carbonate under formation of nitrogen oxides and carbon dioxide. An example of a smectite that can be used as sheet silicate is Baragel® 20, which is an organically modified smectite clay mineral, Suitable sheet silicates which are based on hectorite are, for example, Baragel® 24, Bentone® 27, Bentone® 38, as well as Laponit® EP, RD, RDS, S482 and Laponite® SL25. All of the examples mentioned are available from Elementis Specialties, Inc., Hightstown, USA.

The paraffin wax that can be used to improve the corrosion protection and to stabilise the film after potential heat exposure (during cooling) can, for example, be micro wax, such as Sasolwax 3279 (melting range from 76 to 82° C.) or paraffin wax, Fischer-Tropsch wax, such as Sasolwax C80M (having a softening point of >70° C.) or a mixture of different paraffin waxes.

In order to improve the corrosion protection and to stabilise the film after potential heat exposure (during cooling), the corrosion protection agent according to the invention may preferably have an ester wax or an ester wax mixture in the stead of hydrocarbon paraffin waxes, said ester wax being a natural wax, preferably based on renewable resources. The main components of natural waxes are esters of fatty acids with long-chain, aliphatic, primary alcohols and are predominantly obtained by extraction. A preferred ester wax may, for example, be sunflower wax which mainly contains $C_{42}$-$C_{60}$ esters ($C_{20}$-$C_{32}$ fatty alcohols esterified with $C_{20}$-$C_{28}$ fatty acids) having a dropping point between 74 and 80° C. Sunflower wax is, for example, available from Kahl & Co.KG, Trittau, DE, under the name of Kahlwax 6607 L, or from KosterKeunen Holland BV, Bladel, NL, under the name of Sunflower Wax. In the following, the advantages of the corrosion protection agent according to the invention and the adjustability of the rheologic behaviour as compared with a comparative example of a conventional prior art corrosion protection agent are illustrated by means of examples.

TABLE 2

Comparative example 1 (V1) of a composition of a corrosion protection agent according to EP 2 865 723 B1

| | V1 [wt %] |
|---|---|
| Base fluid: solvent free from VOC and aromatic compounds (Exxsol ™ D140) | 9.89 |
| and paraffinic base oil, solvent-refined | 23.6 |
| Polyester resin (alkyd resin, Synolac® AC 4200) | 22 |
| First wax (Tudamelt 64/66, melting range from 60 to 65° C.) | 2.5 |
| Second wax (Sasolwax 3099, melting range from 35 to 55° C.) | 5 |
| Third wax (Sasolwax 3279, melting range from 76 to 82° C.) | 1.5 |
| Overbased calcium sulphonate (Arcot® 645) | 15 |
| Filler (calcium sulphate) (Trefil® 1313-600) | 20 |
| Skin preventing agent (Ascinin® Anti Skin 0444) | 0.4 |
| Siccative (Borchi® Oxy-Coat), containing 1% catalyst complex | 0.1 |
| Colourant additive (Tinopal® OB) | 0.01 |
| Sum total | 100 |

TABLE 3

Examples B2, B3 and B4 for compositions according to the invention

| | B2 [wt %] | B3 [wt %] | B4 [wt %] |
|---|---|---|---|
| Base fluid (Nexbase® 3030) | 49.44 | | |
| (Nexbase® 3043) | | 47.64 | 46.72 |
| Alkyd resin (Worleekyd® SD 8300) | 6 | 6 | 6 |
| Overbased calcium sulphonate (Arcot® 645) | 16 | 15.7 | 15.18 |
| Filler/pigment, CaCO3 (Omyacarb® 2-AL) | 25 | 25.4 | 24.56 |
| Alkaline compound, ZnO (Bayoxide® Z active) | 2 | 2 | 2 |
| Catalyst, siccative (Borchi® Oxy-Coat 1410), containing 10% catalyst complex | 0.05 | 0.05 | 0.05 |
| Sheet silicates (Baragel® 3000) | — | 1 | 0.4 |
| Swelling agent (propylene carbonate, Jeffsol® PC) | | 0.19 | 0.076 |
| Tap water | | 0.01 | 0.004 |
| Ester wax (Kahlwax 6607L) | — | 2 | 5 |
| Paraffin wax (Sasolwax 3279) | 1.5 | — | — |

TABLE 3-continued

Examples B2, B3 and B4 for compositions according to the invention

|  | B2 [wt %] | B3 [wt %] | B4 [wt %] |
|---|---|---|---|
| Colourant (Tinopal ®) | 0.01 | 0.01 | 0.01 |
| Sum total | 100 | 100 | 100 |

TABLE 4

Examples B5, B6 and B7 for compositions according to the invention

|  | B5 [wt %] | B6 [wt %] | B7 [wt %] |
|---|---|---|---|
| Base fluid (Nexbase ® 3030) (Nexbase ® 3043) | 46.72 | 46.2 | 46.2 |
| Alkyd resin (Worleekyd ® SD 8300) | 6 | 6 | 6 |
| Overbased calcium sulphonate (Arcot ® 645) | 15.66 | 15.18 | 15.18 |
| Filler/pigment, CaCO3 (Omyacarb ® 2-AL) | 24.56 | 24.56 | 24.56 |
| Alkaline compound, ZnO (Bayoxide ® Z active) | 2 | 2 | 2 |
| Catalyst, siccative (Borchi ® Oxy-Coat 1410), containing 10% catalyst complex | 0.05 | 0.05 | 0.05 |
| Sheet silicates (Baragel ® 3000) | — | — | — |
| Swelling agent (propylene carbonate, Jeffsol ® PC) | — | — | — |
| Tap water | — | — | — |
| Ester wax (Kahlwax 6607L) | 5 | 5 | 5 |
| Paraffin wax (Sasolwax 3279) | — | — | — |
| Colourant (Tinopal ®) | 0.01 | 0.01 | 0.01 |
| Odour scavenger: adsorbent (ZEOflair ® 100) | — | 1 | — |
| Reactant (malonic amide) | — | — | 1 |
| Sum total | 100 | 100 | 100 |

TABLE 5

Examples B8 and B9 for compositions according to the invention

|  | B8 [wt %] | B9 [wt %] |
|---|---|---|
| Base fluid (Nexbase ® 3030) | 49.5 | |
| (Nexbase ® 3043) | | 45.74 |
| Alkyd resin (Worleekyd ® SD 8300) | 6 | |
| (Bremar RK ® 7046) | | 6 |
| Overbased calcium sulphonate (Arcot ® 645) | 16 | 16 |
| Filler/pigment, CaCO3 (Omyacarb ® 2-AL) | 25 | 25.4 |
| Alkaline compound, ZnO (Bayoxide ® Z active) | 2 | 2 |
| Catalyst, siccative (Borchi ® Oxy-Coat 1410), containing 10% catalyst complex | 0.05 | 0.05 |
| Sheet silicates (Baragel ® 3000) | 1.2 | 4 |
| Swelling agent (propylene carbonate, Jeffsol ® PC) | 0.228 | 0.76 |
| Tap water | 0.012 | 0.04 |
| Ester wax (Kahlwax 6607L) | — | — |
| Paraffin wax (Sasolwax 3279) | — | — |
| Colourant (Tinopal ®) | 0.01 | 0.01 |
| Sum total | 100 | 100 |

TABLE 6

Brief description of the compositions according to the invention B2 to B9

| | Properties |
|---|---|
| B2 | Low viscosity, with wax/no sheet silicate |
| B3 | Medium viscosity, with wax/with sheet silicate |
| B4 | Medium viscosity, with wax/with sheet silicate, increased cold solidification after heating (higher wax content and lower sheet silicate content than B3) |
| B5 | Low viscosity, with wax/no sheet silicate |
| B6 | Low viscosity, with wax/no sheet silicate, with adsorptive odour scavenger |
| B7 | Low viscosity, with wax/no sheet silicate, with reactive odour scavenger |
| B8 | High viscosity, without wax/with sheet silicate |
| B9 | Very high viscosity, without wax/with sheet silicate |

FIG. 1 illustrates the rheologic behaviour of the corrosion protection agent according to the invention B8 which comprises sheet silicate to improve the thermal stability, as compared with the conventional composition V1 in which a wax mixture consisting of different waxes provides for an improved drop inhibition. As can be seen from FIG. 1, both compositions, i.e., B8 according to the invention and the conventional V1, have a thixotropic behaviour: The dynamic viscosity is significantly reduced under shear stress, with the result that the compositions can be sprayed even at room temperature. Since the shear stress decreases within seconds, the viscosity increases again after spraying while there is penetration into cracks, and drop inhibition will commence before the resin hardens after a few hours. The difference between the composition according to the invention B8 and the conventional composition V1 lies in the clearly larger viscosity difference between the rest phase and the shear phase, wherein the viscosity at rest of the composition according to the invention B8 is clearly larger than that of the conventional composition V1, whereas the shear viscosities are within similar ranges, with the result that the composition according to the invention B8 can be sprayed and can penetrate into cracks just as well as the conventional composition V1. Due to the higher increase in viscosity, however, the composition according to the invention B8 has a clearly lower drop tendency after it has been applied.

Figure 2:
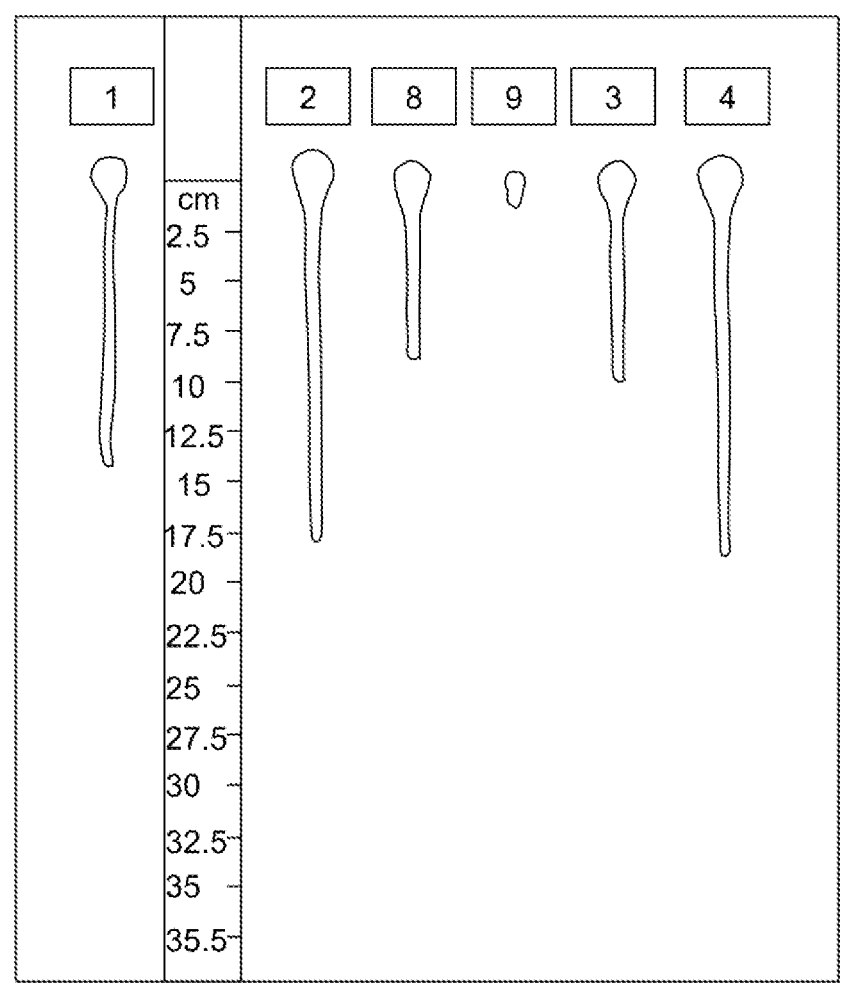
FIG. 2 is a photographic image of a drop test of different corrosion protection agents according to the invention B2, B8, B9 B3 and B4 as compared with the conventional corrosion protection agent V1 at an application temperature of 20° C. and a substrate temperature of 20° C.
Figure 3:
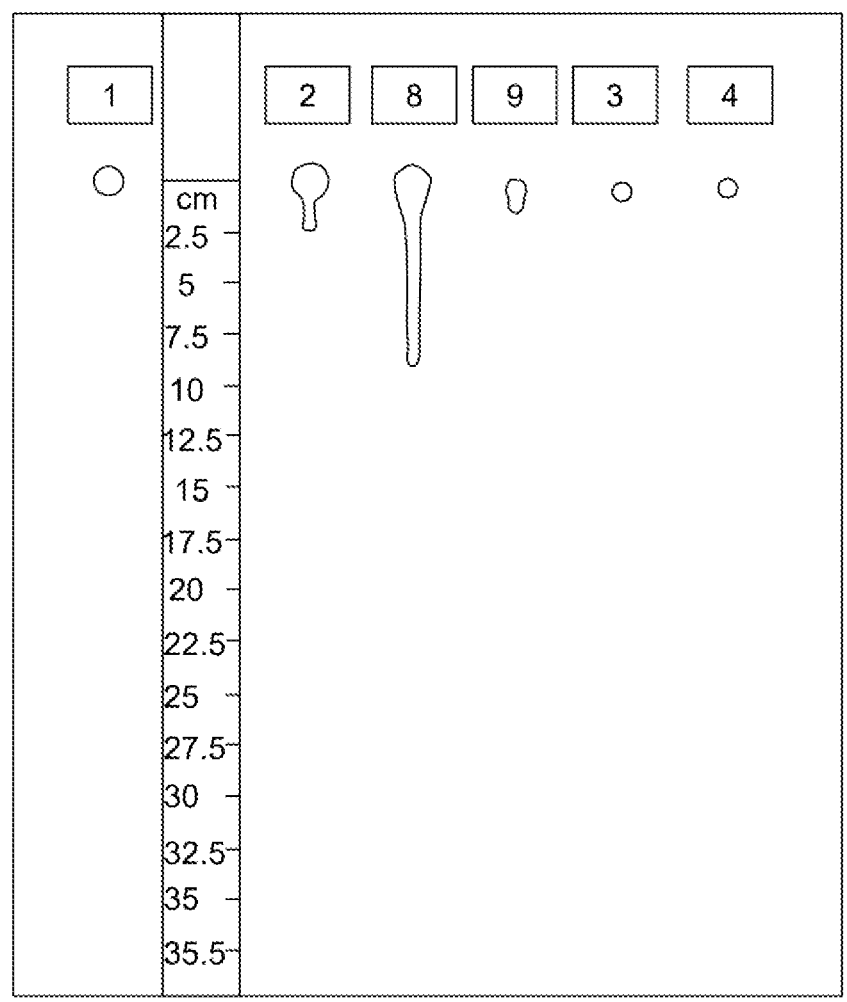
FIG. 3 is a photographic image of a drop test of the corrosion protection agents according to the invention B2, B8, B9 B3 and B4 as compared with the conventional corrosion protection agent V1 at an application temperature of 20° C. and a substrate temperature of 60° C.
Figure 4:
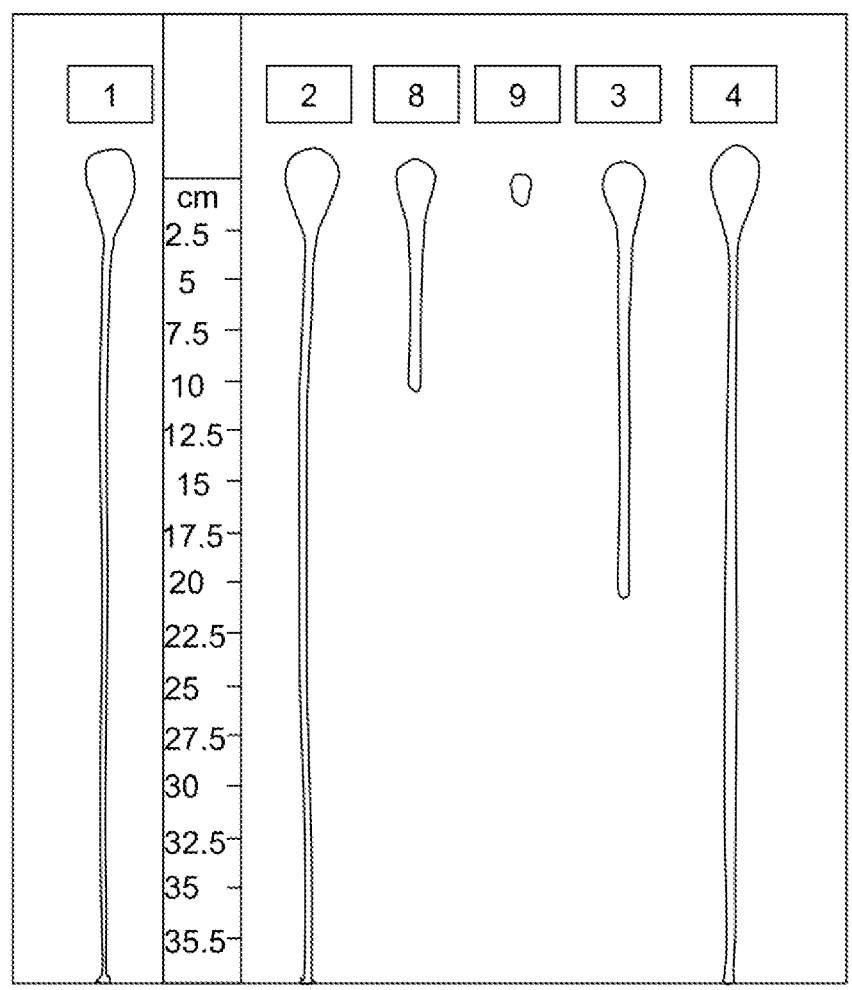
FIG. 4 is a photographic image of a drop test of the corrosion protection agents according to the invention B2, B8, B9 B3 and B4 as compared with the conventional corrosion protection agent V1 at an application temperature of 60° C. and a substrate temperature of 20° C.

FIGS. 2 to 4 show photographic images of drop tests of a conventional corrosion protection agent V1 and different corrosion protection agents according to the invention (B2, B8, B9, B3 and B4) at different application and substrate temperatures. Each image is provided with an associated rule.

The drop test for determining the rheologic behaviour is carried out according to the following steps:

1. A predetermined amount, e.g. 200 g, of the respective corrosion protection agent (V1, B2, B8, B9, B3, B4) is stirred at a predetermined application temperature $T_A$ (20° C. in the illustrated instance) and at a predetermined speed (300 min$^{-1}$ in the illustrated instance).

2. A substrate, e.g. a metal sheet, is provided in a horizontal position at a predetermined substrate temperature $T_S$ (20° C. or 60° C. in the illustrated instance).

3. Using a pipette or a different suitable sampling device, a predetermined volume of each respective corrosion protection agent (200 µl in the illustrated instance) is taken and vertically applied onto the horizontal surface of the sheet metal sample.

4. After a predetermined period of time (7 seconds in the illustrated instance), the sheet metal sample is raised from the horizontal into a vertical sheet position.

5. The dropping of the corrosion protection agent is observed and/or measured.

6. Photographic images are taken after a predetermined dropping time (10 minutes in the illustrated instance).

Each sheet metal sample has applied on it one sample of the conventional composition V1 on the left of the rule and five samples of corrosion protection agents according to the invention B2, B8, B9, B3 and B4 (from left to right) on the right of the rule, the compositions of which are mentioned above. The conventional composition V1 primarily differs from the compositions according to the invention, which have between 45 and 49.5 weight percent of base fluid, 6 weight percent of alkyd resin and 0 to 5 weight percent of wax and/or 0 to 4 weight percent of sheet silicate, in its contents of base fluid (33.49 weight percent in total), alkyd resin (22 weight percent) and wax (9 weight percent in total), while the contents of sulphonate component (15 to 16 weight percent) and filler (20 to 25.4 weight percent) are similar.

The main differences of the compositions according to the invention among the same primarily lie in the different contents of sheet silicate and wax: 82 does not contain any sheet silicate but 1.5 weight percent of paraffin wax and additionally comprises a somewhat higher content of base fluid (Nexbase 3030) the viscosity and viscosity index are somewhat lower than the viscosity and the viscosity index of the base fluid (Nexbase 3043) of the other compositions according to the invention. The composition B2 contains 1.2 weight percent of sheet silicate but no wax; 89 contains 4 weight percent of sheet silicate and no wax: B3 contains 1 weight percent of sheet silicate and 2 weight percent of ester wax; and B4 contains 0.4 weight percent of sheet silicate and 5 weight percent of ester wax.

The predetermined application temperatures $T_A$ (20° C. or 60° C.) and sheet metal temperatures $T_S$ (20° C. or 60° C.) are given below each diagram: In the diagram of FIG. 2, the metal sheet has a temperature $T_S$ of 20° C., wherein the corrosion protection agents V1, B2, B8, B9, B3, B4 were applied at $T_A$=20° C. In the diagram of FIG. 3, the metal sheet has a temperature $T_S$ of 20° C., and the corrosion protection agents V1, B2, B8, B9, B3, B4 were applied at $T_A$=60° C. In the diagram of FIG. 4, the metal sheet sample has a temperature $T_S$ of 60° C., wherein V1, B2, B8, B9, B3, B4 were again applied at $T_A$=20° C. The rule shown on each sheet metal sample can be used to evaluate the drop behaviour.

The result shows that the drop sections of the compositions B8 and B9 which do not contain any wax differ from each other, but that the drop behaviour of the compositions B8 or B9 are similar in all of the three tests (FIGS. 2, 3 and 4), wherein composition B8 shows a drop section of 7.5 to 10 cm and composition B9 shows a drop section of less than 2.5 cm. The drop behaviour of the wax-free compositions B8 and B9, which contain sheet silicate, is largely not dependent on the application temperature $T_A$ or the metal sheet temperature $T_S$. In contrast, the compositions B2, B3, B4, which contain waxes, as well as the comparative example V1 show a different drop behaviour at different application temperatures $T_A$ and metal sheet temperatures $T_S$.

FIGS. 2 and 4 show that the drop behaviour of the wax-containing compositions B2, B3, B4 and V1 depends on the substrate temperature with the application temperature $T_A$=20° C. remaining the same. Therein, the drop behaviour of composition B4 which contains 5 weight percent of ester wax (melting range 74 and 80° C.) and 0.4 weight percent of sheet silicate is similar to the drop behaviour of composition B2 which, with 1.5 weight percent, contains a significantly lower amount of paraffin wax (melting range 76 to 82° C.), i.e., but does not contain sheet silicate: At a substrate temperature $T_S$=20° C. (FIG. 2), the drop sections of the compositions B2 and B4 are approx. 17.5 cm. The drop tendency which increases with increasing wax content can, therefore, be compensated by adding sheet silicate. The drop section of the comparative example V1 which is within a range of 12.5 to 15 cm and thus somewhat shorter despite the even higher wax content of 9 weight percent can be attributed to its significantly lower content of base fluid. With 2 weight percent of wax, the composition according to the invention B3, however, comprises a similar wax content as B2 but additionally contains 1 weight percent of sheet silicate which provides for the better drop inhibition as compared with B2, as is shown by the drop section of approx. 10 cm for B3 which is within the range of the drop section of B8 which does not contain any wax but, with 1.2 weight percent of sheet silicate, contains a similar sheet silicate content as B3. With the substrate and application temperatures $T_S$, $T_A$ of 20° C. being the same, the drop behaviour is affected by the sheet silicate content rather than by the wax content.

If the substrate and application temperatures $T_S$, $T_A$ are different, the wax content plays a more important role. At a substrate temperature $T_S$=60° C. (FIG. 4) and an application temperature $T_A$=20° C., the compositions according to the invention B2 and B4, which do not contain any sheet silicate or only a small amount thereof, virtually does not show any drop inhibition just as the comparative composition V1; therein, the drop sections of more than 37.5 cm extend across the complete metal sheet sample, i.e., the samples have dropped off the metal sheet sample by 10 cm during the test period. In contrast, the sample B3 having a sheet silicate content of 1 weight percent shows an improved drop inhibition with a drop section of approx. 20 cm—which is particularly improved as compared with B2 which comprises a similar wax content but no sheet silicate. However, the drop section of B3 is significantly longer than the approx. 10 cm long drop section of composition B8 which, with 1.2 weight percent, comprises a sheet silicate content similar to that of B3 but does not contain any wax.

If the compositions V1, B2, B8, B9, B3, B4 are applied onto a cold metal sheet $T_S$=20° C. at an increased application temperature $T_A$=60° C. (FIG. 3), the wax-free compositions B8 and B9 have the same drop behaviour as in the other two tests with drop sections of 7.5 to 10 cm (B8) and less than 2.5 cm (B9), wherein the evolving drop inhibition is dependent on the sheet silicate content. With the exception of B2, the wax-containing compositions V1, B2, B3, B4 virtually show an immediately evolving drop inhibition, i.e., they solidify after the application without dropping. Composition B2 which, with 1.5 weight percent, comprises the lowest wax content only shows a short drop section of less than 2.5 cm, i,e., drop inhibition evolves shortly after the application here as well. In this test, the wax-containing compositions show what is called the drop stop effect in which the waxes present in the corrosion protection agent are dissolved due to the increased application temperature, with the result that, when the composition is applied onto the comparatively cold metal sheet, there will be a kind of quench hardening resulting in rapid solidification or gel formation.

The drop tests show that the drop behaviour of the corrosion protection agent according to the invention can be specifically adjusted to the substrate and application temperatures intended in the application by means of the contents of sheet silicate and wax. While a corrosion protection agent which contains sheet silicate but no wax has an almost temperature-independent drop behaviour, wax-containing corrosion protection agents show a drop behaviour which is affected by the sheet silicate content rather than by the wax content at identical substrate and application temperatures $T_S$, $T_A$ of 20° C. . With cold application on a heated substrate, however, higher wax contents result in a significantly poorer drop behaviour, which can be at least partially compensated by adding sheet silicate. In this application configuration with cold application on a heated substrate, compositions without sheet silicate show little or no drop inhibition. When the compositions are applied onto a heated substrate or metal sheet, however, the application temperature of the wax-containing compositions of the corrosion protection agent has less influence on the drop behaviour than the contents of sheet silicate and wax in the respective composition because, herein, the wax-containing compositions show a drop stop effect whereas the drop inhibition in compositions without wax is essentially dependent on the sheet silicate content.

Hence, the rheologically active components of the corrosion protection agent according to the invention can be divided into the following structural generators:

Newtonian fluids (e.g., base fluid) the viscosity of which does not depend on the temperature or shear, for which reason group III base oils having a high viscosity index of more than 100, preferably of more than 120, are preferred;

inorganic components (e.g., calcium carbonate filler) having a shear-dependent viscosity but without any influence on the temperature;

activated (decomposed) sheet silicate as shear-thinning component which causes a strongly shear-dependent viscosity, without essential change in viscosity with short-term temperature application;

paraffin and/or ester wax with temperature-dependent viscosity for temperature-dependent film hardening and improved film stability after completed heat exposure;

(chemically) reactive components (e.g., alkyd resin) which, being an initial component having not undergone any reaction, rather shows Newtonian behaviour but results in shear thinning with a strongly increasing viscosity after polymerisation, wherein this effect takes place with a significant time delay (1 to 3 days) as compared with the above physical effects.

The rheologic behaviour desired for the application can be adjusted by selecting the ratios of these structural generators accordingly: flowing after spraying and penetration into cracks, sprayability, thermal stability of the film, mechanical stability of the film, etc.

As a result, a corrosion protection agent that is adjusted to the respective temperature conditions can be provided for every production process in which a cavity of a component is to be sealed with a corrosion protection agent, so that it can be sprayed and penetrate into cracks in an optimal manner before the formed film starts to gel and hardens, with the result that, in the subsequent process steps, corrosion protection agent no longer exits from the component, irrespective of the temperatures then evolving. Depending on a user's, for example a car manufacturer's, specific requirements, it is possible to specifically adjust the rheologic properties of the corrosion protection agent. As a general rule, car manufacturers require film stabilities at 90 to 105° C. The wax content provides for thermal stability up to approx. 70° C. (by dissolving/gelling); at higher temperatures, the applied film is stabilised by the polymerised alkyd resin.

Figure 5:
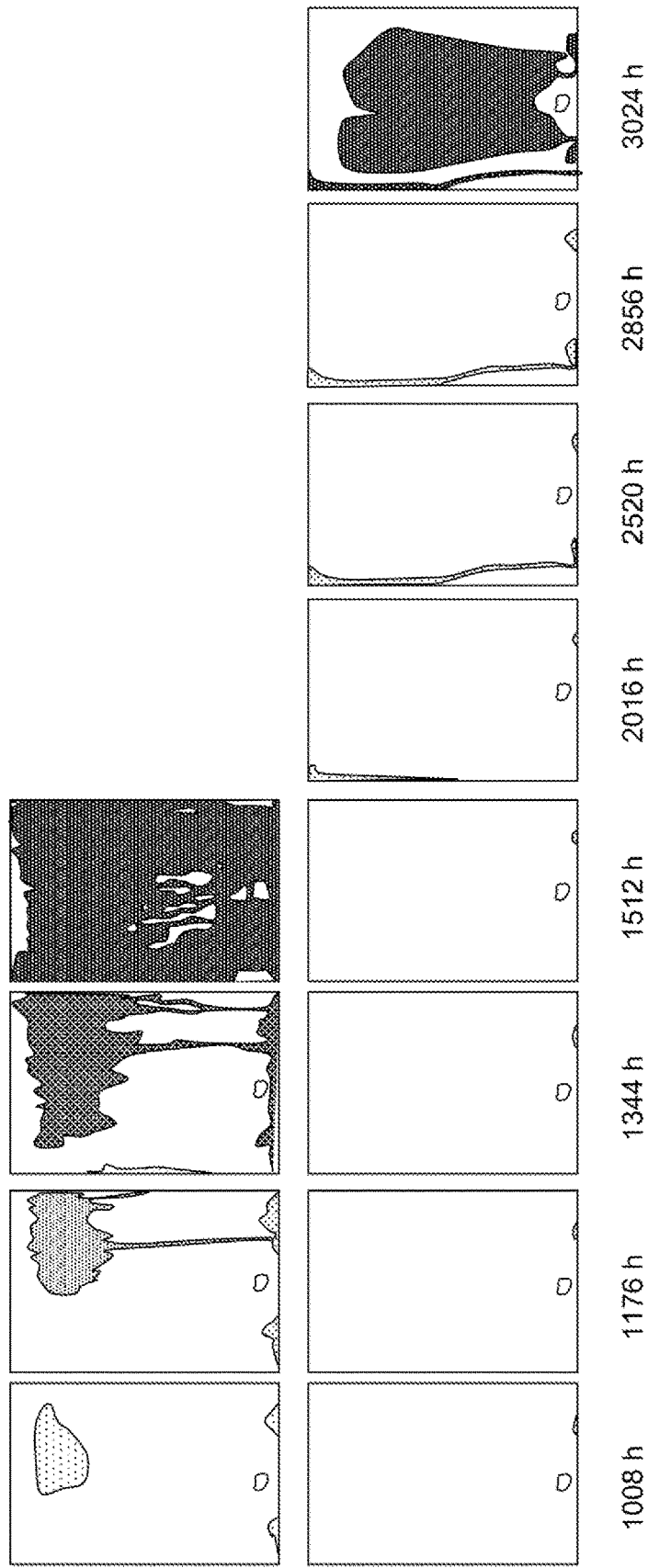
FIG. 5 shows a sequence of four photographic images of a salt spray test with the conventional corrosion protection agent V1 and a sequence of eight images of a salt spray test with a corrosion protection agent according to the invention B5.

FIG. 5 illustrates the improved corrosion protection properties of a corrosion protection agent according to the invention B5 (see Table 4) as compared with the conventional composition V1 (see Table 2). For testing the corrosion, salt spray tests were carried out according to DIN EN ISO 9227 NSS. Steel panels, i.e. Q-panels R46, which were coated with the respective corrosion protection agents V1 and B5 with a coating thickness of 50 µm, were selected as substrate.

The upper row in FIG. 5 shows four images of a metal sheet, which was coated with the composition V1, after 1008 h, 1176 h, 1344 h, and 1512 h of salt spray tests. There are clear signs of corrosion as early as after 1176 h. After 1512 h, the metal sheet coated with V1 shows surface corrosion, so that the test was broken off. The lower row shows eight images of a metal sheet that was coated with the composition according to the invention B5. This metal sheet does not yet show any signs of corrosion after 1512 h. After 2016 h of salt spray test, there are signs of corrosion at the left-hand edge of the metal sheet which moderately increase after 2520 h and 2856 h. In the case of the metal sheet that was coated with the corrosion protection agent according to the invention B5, surface-wide corrosion occurs only after 3024 h of salt spray test. Since, with 15.66 and 15.0 weight percent, respectively, both compositions B5, V1 have comparative contents of overbased calcium sulphonate as corrosion protection agent, this clear difference is surprising, the more so as V1, with a total of 9 weight percent of wax which also contributes to corrosion protection. contains even more wax than B5 with 5 weight percent of ester wax. The considerable improvement of the corrosion protection of the composition according to the invention B5 is achieved by the significantly reduced alkyd resin content (6 weight percent instead of 22 weight percent), the addition of 2 weight percent of zinc oxide as alkaline acid scavenger component together with the alternatively used calcium carbonate filler (24.56 weight percent) instead of calcium sulphate (used in V1 with 20.0 weight percent). There are no images of further test series with further examples of the corrosion protection agent according to the invention. However, it has been shown that the corrosion tests for all examples are similarly good. This results in approximately a doubling of the duration of protection in the salt spray test ISO 9227 NSS.S.

Figure 6:
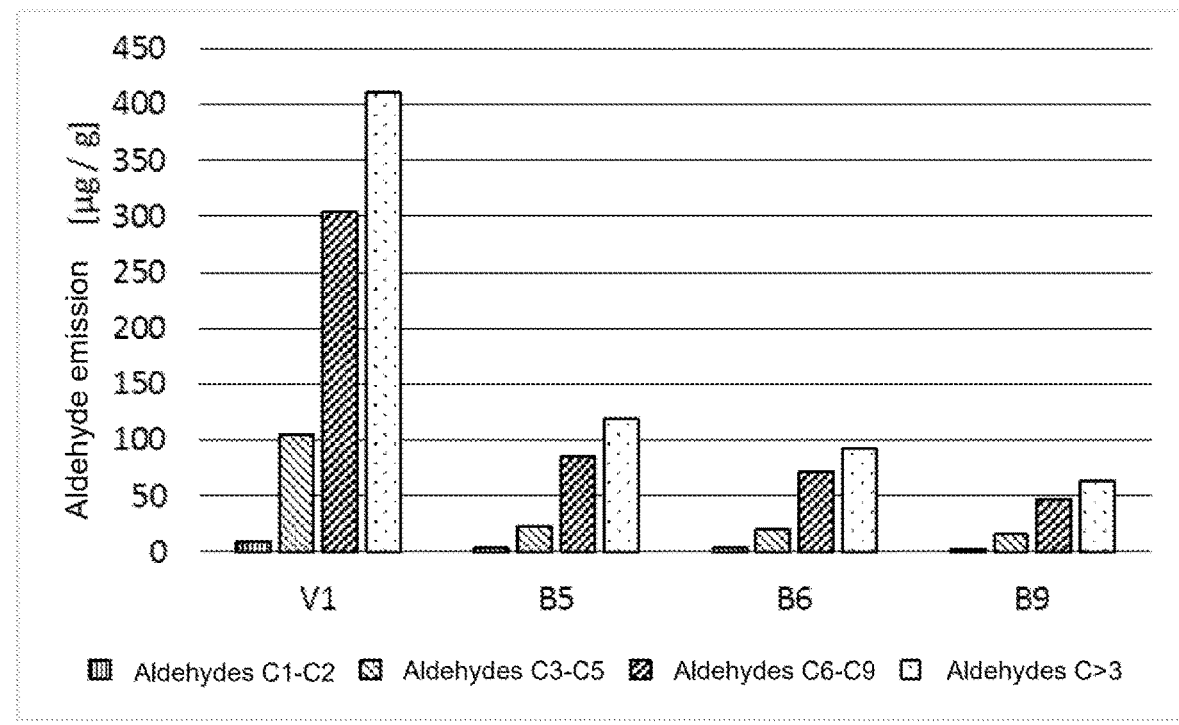
FIG. 6 is a diagram of aldehyde emissions of the corrosion protection agents according to the invention B5, B6 and B9 as compared with the conventional corrosion protection agent V1.
Figure 7:
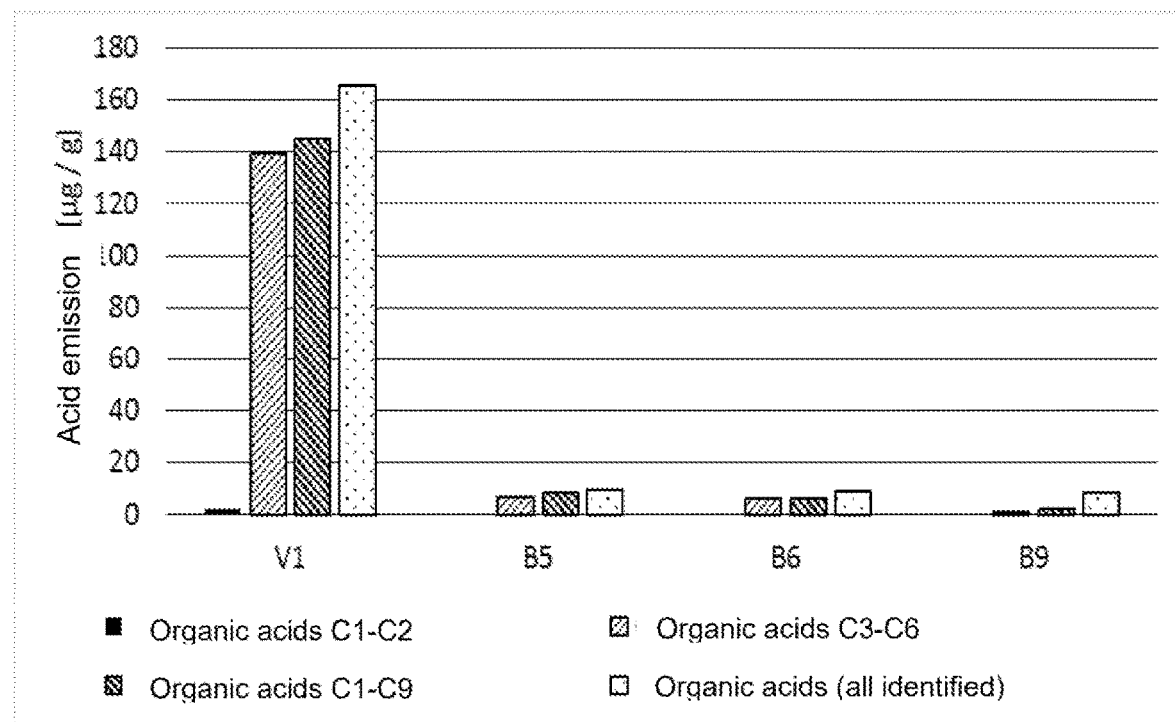
FIG. 7 is a diagram of acid emissions of the corrosion protection agents according to the invention B5, B6 and B9 as compared with the conventional corrosion protection agent V1.
Figure 8:
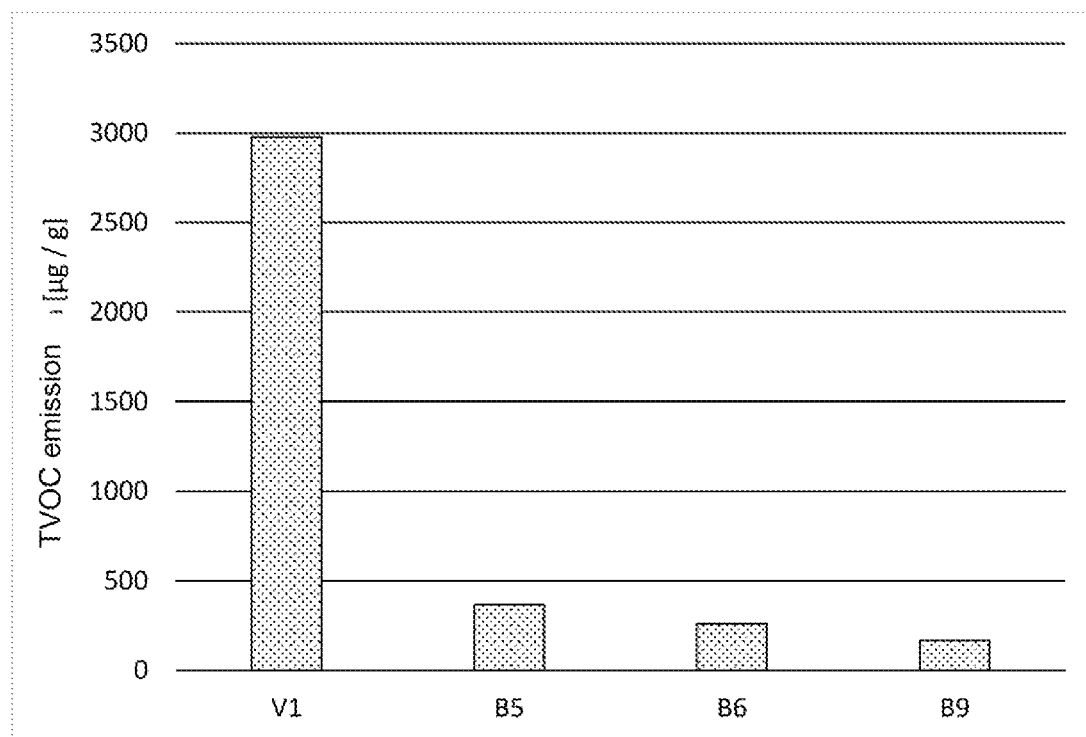
FIG. 8 is a diagram of TVOC emissions of the corrosion protection agents according to the invention B5, B6 and B9 as compared with the conventional corrosion protection agent V1.

FIGS. 6 to 8 show diagrams of the emissions (emission measurements according to ISO 16000-3) of the conventional corrosion protection agent V1 (see Table 2) as compared with the corrosion protection agents according to the invention B5, B6 and B9 (see Tables 4 and 5). The significantly reduced content of alkyd resin (6 weight percent in the examples according to the invention as compared with 22 weight percent in the conventional composition V1) as well as the absence of anti-skin agent in all of the examples according to the invention contribute to the reduction of the odour and the emissions of volatile organic compounds, such as aldehydes and short-chain organic acids.

Furthermore, low-emission alkyd resins, such as Worlée-Kyd® SD 8300 (B5, B6) having a non-volatile content of at least 98 weight percent or Bremer® RK 7046 (B9) having a solid body content of 100 weight percent, are used in the compositions according to the invention, whereas alkyd resins, such as Synolac®, having a non-volatile content of only 50 to 75 weight percent and are present in solvents, such as xylene, solvent naphta, are used in the conventional corrosion protection agents.

This is clearly reflected in the TVOC emissions (total volatile organic compounds) which are plotted for the conventional corrosion protection agent V1 against the corrosion protection agents according to the invention B5, B6 and B9 in FIG. 8 in a bar diagram. With 2,977 µg/g, the conventional composition V1 shows more than six times as many TVOC emissions as the compositions according to the invention B5 (367 µg/g), 86 (258 µg/g) and B9 (167 µg/g), i.e., the compositions according to the invention B5, B6 and B9, respectively, only have 12%, 8.7% and 5.6%, respectively, of the emissions in relation to V1. On the one hand, the different emission values of the compositions according to the invention can be attributed to the addition of adsorbent (ZEOflair®) as odour scavenger as compared with the otherwise identical composition B5 and, on the other hand, to an alternative alkyd resin in B9 (Bremer® RK 7046 instead of WorléeKyd® SD 8300).

The results for the aldehyde emissions and the emissions of organic acids formed while the alkyd resin is hardening also show a significant reduction for the example compositions according to the invention B5, B6 and B9 as compared with the conventional composition V1.

The bar diagram in FIG. 6 shows the aldehyde emissions for C1-C2 aldehydes, C3-C5 aldehydes, C6-C9 aldehydes and the sum total of the aldehydes with C>3, each for the comparative composition V1 and the example compositions B5, B6 and B9. With 10.2 µg/g, V1 already shows low emissions for the C1 and C2 aldehydes, but the compositions according to the invention B5 (4.6 µg/g), B6 (4.4 µg/g) and B9 (2.3 µg/g) still fall below these values. The reduction of the emissions for the C3-C5 aldehydes from 104.7 µg/g for V1 to 22%, 20% and 16% for B5, B6 and B9, respectively, in relation to V1, and for the C6-C9 aldehydes from 304 µg/g for V1 to 28%, 23% and 15% for B5, B6 and B9, respectively, in relation to V1, is even more significant. In total, the emission of aldehydes with C>3 is reduced from 410.2 µg/g for V1 to barely 30% (118.6 µg/g for B5), 23% (92.4 µg/g for B6) and 16% (64 µg/g for B9), respectively, in relation to V1. Apart from the significant reduction of the aldehyde emissions as compared with the comparative prior art composition V1, it can be seen that the addition of the adsorbent in B6 and the use of an alternative alkyd resin in B9 results in further reductions, wherein the larger reduction is achieved by using the alternative alkyd resin.

The bar diagram in FIG. 7, in which the acid emissions are subdivided into C1-C2 acids, organic C3-C6 acids, sum total of organic C1-C9 acids and sum total of all organic acids for the comparative composition V1 and each of the example compositions B5, B6 and B9, shows similar results. The examples according to the invention B5, B6 and B9 can reduce the emission value of the C1 and C2 acids of 1.9 µg/g, which is already low for V1, to 0.2 µg/g (B5), 0.09 µg/g (B6) and 0.1 µg/g (B9), respectively. The organic acids with C3-C6 show a more significant emission reduction, which also applies for the acids with C1-C9 and all identified organic acids.

As compared with 139 µg/g emission of organic C3-C6 acids by V1, only 6.87 µg/g (5%), 6 µg/g (4.3%) and 1.1 µg/g (0.8%) are measured for the example compositions according to the invention B5, B6 and B9 (percentages in relation to the V1 value). Similar results can be seen for the organic C1-C9 acids for which, for V1, a value of 144.9 µg/g and, for B5, B6, and B9, values of 8.17 µg/g, 6.3 µg/g and 2.3 µg/g, respectively, were measured, this corresponding to 5.6%, 4.3% and 1.6% in relation to the V1 value. A value of 165.4 µg/g was measured for all identified organic acids for V1, and values of 9.3 µg/g, 8.9 µg/g and 8.4 µg/g, respectively, were measured for B5, B6 and B9, this corresponding to 5.6%, 5.4% and 5.1% in relation to the V1 value.

In the case of the C1-C2 acids, the lowest emissions are achieved with the composition B6 which contains the adsorbent ZEOflair®; however, this is only slightly lower than with B9 which comprises an alternative alkyd resin as compared with B5 and B6. As regards the further acid emissions. In particular the C3-C6 acids but C1-C9 acids as well, the example composition B6 shows lower emissions than the example composition B5 without adsorbent, and the example composition B9 which comprises the alternative alkyd resin shows even more significantly reduced emission values, while the total emissions of all identified organic acids are within a similar range for the three compositions according to the invention B5, B6 and B9. Although this means that the use of the alternative alkyd resin in B9 results in higher emissions of organic acids>C9 than the alkyd resin of the B5 and B6 examples, the emissions of these longer-chain and less volatile components are less relevant for odour.

The example composition B7, which differs from B6 only in that the reactant malonic amide instead of the adsorbent ZEOflair® is used as odour scavenger component, shows similar emission results as B6, for which reason they are not separately represented and illustrated at this point.

What is claimed is:

1. A corrosion protection agent for the preservation of cavities, which comprises a basic composition of
    40 to 50 weight percent of base fluid,
    3 to 10 weight percent of alkyd resin,
    10 to 20 weight percent of sulphonate and/or salicylate component,
    15 to 25 weight percent of filler,
    0.003 to 0.007 weight percent of siccative catalyst,
    each in relation to the total mass of the corrosion protection agent,
    and which, in order to adjust the rheologic properties of the corrosion protection agent, furthermore comprises
    1 to 5 weight percent of sheet silicate
    and/or
    1 to 8 weight percent of ester wax and/or paraffin wax,
    each in relation to the total mass of the corrosion protection agent,
    wherein the corrosion protection agent comprises no aminic corrosion protection components, no aminic binding agent components, and no anti-skin agent.

2. The corrosion protection agent according to claim 1, characterized in that
    the basic composition furthermore comprises
    0.5 to 5 weight percent of an alkaline acid scavenger component which is selected from a group consisting of alkaline and alkaline earth salts, zirconium phosphate, and zinc oxide, and/or
    0.1 to 5 weight percent of odour scavenging component which is selected from adsorbents for aldehydes comprising zeolites and reactive components for the conversion of aldehydes comprising amides,
    and/or
    0.001 to 0.05 weight percent of a colourant additive, each in relation to the total mass of the corrosion protection agent.

3. The corrosion protection agent according to claim 1, characterized in that
    when sheet silicate is present in the corrosion protection agent, the corrosion protection agent comprises at least one polar swelling agent component with at least one carbonyl and/or hydroxyl group, wherein the polar swelling agent component is selected from a group consisting of water, short-chain alcohols, esters, and ketones, as well as mixtures thereof, wherein a content of the at least one polar swelling agent component is within a range of 10 to 30 weight percent, in relation to the mass of the sheet silicate.

4. The corrosion protection agent according to claim 1, characterized in that the base fluid is a non-polar solvent or a polar solvent which is selected from a group consisting of water, methanol, ethanol, other short-chain alcohols, acetone, as well as mixtures thereof, and/or the alkyd resin is a low-odour and low-emission, low viscosity, non-water-mixable and air-drying alkyd resin, and/or the sulphonate and/or salicylate component is selected from a group consisting of overbased calcium sulphonate, overbased magnesium sulphonate and overbased calcium salicylate and mixtures thereof, and/or the filler is selected from a group consisting of carbonate, silicone dioxide, silicate, sulphate, oxide or mixtures thereof, and/or the siccative catalyst is a heavy-metal-based complex, and/or the sheet silicate is a three-sheet silicate or a mixture having a three-sheet silicate, and/or the ester and/or paraffin wax comprises a dropping point within a range of 65 to 90° C.

5. A method of using a corrosion protection agent according to claim 1 for the preservation of cavities of a component, the method comprising adjusting the rheologic properties of the corrosion protection agent subject to an application temperature and a component temperature by means of the predeterminable/predetermined contents of the sheet silicate and the ester and/or paraffin wax.

6. The corrosion protection agent according to claim 2, characterized in that the alkaline and alkaline earth salts are selected from the group consisting of phosphates, carbonates, silicates, hydroxides, oxides, and sulphonates.

7. The corrosion protection agent according to claim 6, characterized in that the sulphonates are overbased sulphonates.

8. The corrosion protection agent according to claim 1, characterized in that the colourant additive is a fluorescent colourant additive.

9. The corrosion protection agent according to claim 3, characterized in that the corrosion protection agent comprises 0.019 to 1.33 weight percent of the organic polar swelling agent component and 0.005 to 0.07 weight percent of water, each in relation to the total mass of the corrosion protection agent.

10. The corrosion protection agent according to claim 9, characterized in that the organic polar swelling agent component is propylene carbonate.

11. The corrosion protection agent according to claim 3, characterized in that the short-chain alcohols are methanol and ethanol, the esters are propylene carbonate, and the ketones are acetone.

12. The corrosion protection agent according to claim 4, characterized in that the non-polar solvent is a group II, group III or group IV base oil having a kinematic viscosity (40° C.) within a range of 5 to 40 $mm^2/s$.

13. The corrosion protection agent according to claim 4, characterized in that the air-drying alkyd resin is a long-oil alkyd resin and comprises a non-volatile content of at least 90% and a dynamic viscosity (20° C.) of 500 to 12,000 mPa·s.

14. The corrosion protection agent according to claim 4, characterized in that the three-sheet silicate is selected from montmorillonite and hectorite and the mixture is selected from bentonites and smectites.

15. The corrosion protection agent according to claim 4, characterized in that the mixture having a three-sheet silicate is selected from bentonites and smectites.

16. The corrosion protection agent according to claim 4, characterized in that the heavy-metal-based complex is an iron-based complex.

* * * * *